US006538673B1

(12) United States Patent
Maslov (10) Patent No.: US 6,538,673 B1
(45) Date of Patent: Mar. 25, 2003

(54) METHOD FOR EXTRACTING DIGESTS, REFORMATTING, AND AUTOMATIC MONITORING OF STRUCTURED ONLINE DOCUMENTS BASED ON VISUAL PROGRAMMING OF DOCUMENT TREE NAVIGATION AND TRANSFORMATION

(75) Inventor: Vadim Maslov, Herndon, VA (US)

(73) Assignee: Divine Technology Ventures, Chicago, IL (US)

( * ) Notice: Subject to any disclaimer, the term of this patent is extended or adjusted under 35 U.S.C. 154(b) by 0 days.

(21) Appl. No.: 09/548,718

(22) Filed: Apr. 13, 2000

Related U.S. Application Data (60) Provisional application No. 60/149,911, filed on Aug. 23, 1999.

(51) Int. Cl.[7] .................................................. G06F 3/14
(52) U.S. Cl. ........................ 345/853; 345/854; 345/733; 345/764; 345/765; 709/217
(58) Field of Search ................................. 345/356, 357, 345/329, 339, 333, 334, 967, 853, 854, 733, 764, 765; 707/501, 513, 514, 515, 516, 517; 709/217

(56) References Cited

U.S. PATENT DOCUMENTS

| 4,498,147 A | * | 2/1985 | Agnew et al. | |
|---|---|---|---|---|
| 5,504,853 A | * | 4/1996 | Schuur et al. | 345/853 |
| 5,555,362 A | * | 9/1996 | Yamashita et al. | 707/517 |
| 5,629,846 A | * | 5/1997 | Crapo | 708/705 |
| 5,640,579 A | * | 6/1997 | Koppolu et al. | 707/526 |
| 5,774,123 A | * | 6/1998 | Matson | 345/357 |
| 5,819,092 A | * | 10/1998 | Ferguson et al. | 395/701 |
| 5,903,897 A | * | 5/1999 | Carrier, III et al. | 707/203 |
| 5,956,709 A | * | 9/1999 | Xue | 707/3 |
| 5,963,208 A | * | 10/1999 | Dolan et al. | 345/357 |
| 6,161,107 A | * | 12/2000 | Stern | 707/104 |
| 6,377,956 B1 | * | 4/2002 | Hsu et al. | 707/104.1 |

* cited by examiner

Primary Examiner—Kristine Kincaid
Assistant Examiner—Thomas T. Nguyen
(74) Attorney, Agent, or Firm—Bell, Boyd & Lloyd LLC (57) ABSTRACT

A method for extracting digests, reformatting, and automatic monitoring of structured online documents based on visual programming of document tree navigation and transformation is provided for structured online documents such as HTML, XML, SGML document, or any other document that has internal structure that can be represented by a tree. A digest of an online document is a collection of fragments of this document which are of interest to a user. The system is based on a technique whereby a user selects a fragment of an online document shown in a source window and copies this fragment to the target window that contains the reformatted digest. The system generates a sequence of web site navigation commands, online document tree navigation commands, and "Copy Fragment" commands that cause the assembly of the reformatted digest in the target window. The user can later ask the system to replay the generated commands, thus causing automatic creation of the reformatted digest of the changed version of the online document. Therefore, when content of the original document changes, the change is automatically propagated to the digest document. This allows implementation of a simple automatic monitoring of online documents or their reformatted digests. The digest document is usually much smaller than the original document, and usually it does not contain computationally intensive and bandwidth intensive multimedia elements such as graphics, sounds, applets, and scripts. This considerably lowers the bandwidth and processing power requirements for user agents that display document digests. Therefore digest documents can be displayed by user agents running on wireless and portable computing devices that have bandwidth and computational power limitations.

4 Claims, 7 Drawing Sheets

METHOD FOR EXTRACTING DIGESTS, REFORMATTING, AND AUTOMATIC MONITORING OF STRUCTURED ONLINE DOCUMENTS BASED ON VISUAL PROGRAMMING OF DOCUMENT TREE NAVIGATION AND TRANSFORMATION

RELATED APPLICATION DATA

The present invention claims the benefit of United States Provisional Patent Application Serial No. 60/149,911 filed on Aug. 23, 1999.

FIELD OF THE INVENTION

The present invention relates to a method for extracting digests, reformatting, and automatic monitoring of structured online documents based on visual programming of document tree navigation and transformation. More particularly, the invention relates to a system and method whereby a user selects a fragment of an online document shown in a source window and copies this fragment to the target window, the system creates a sequence of commands that can reproduce this behavior when applied to the new versions of the source documents downloaded from the information source, such as web site.

BACKGROUND OF THE INVENTION

Structured online documents, especially HTML and XML documents available on the World Wide Web (WWW) have become very important in the past few years. Such documents contain data which may be periodically updated, wherein such updating does not substantially change the format of presentation of such data.

These online documents usually are dynamically generated by the web servers and they present data stored in online databases. This data periodically changes, but since these documents are automatically generated by computers, the presentation document structure remains substantially the same for relatively long periods of time. Additionally, even when the web page is updated manually, the presentation document structure may remain substantially the same for relatively long periods of time.

Examples of such frequently updated online documents include: stock quotes from brokerage web sites; prices of specific items from online commercial vendor sites and from online auction sites; local weather information from weather web sites; airline ticket information provided by airline or travel sites; shipment tracking information from the mail delivery companies; current news headlines from the news organizations web sites; latest press releases of a specific company issued on their web site; bank account balances for an individual or corporation from the bank web site.

While all this data may be of great interest to the user, it is often accompanied by data that is unimportant or even irrelevant to a particular user. This irrelevant data unnecessarily complicates comprehension and interpretation of the relevant data and often leads to the user missing important changes in the relevant data.

Examples of the data that may be unimportant to the user are:
1. Stock quotes for a stock of interest to the user are often accompanied by other data such as number of shares outstanding, opening and closing prices, earnings in the last quarter and so on. While the user may need to check this data once every 2 or 3 months, the user is not likely to want to see this data every time a current stock quote is sought.
2. Fluctuating price for an item in an online store that interests user may be accompanied with advertising for other items that the user has no interest in or it may be accompanied with product photographs which user has already seen many times.
3. Balances of the user's bank accounts may appear in separate online documents (web pages) and be accompanied by the last 10 transactions. The user, however wants to monitor only balances of all his or her accounts in the bank so that every balance appears in a small window unaccompanied by any other information.

In addition to this, if the user wants to monitor important data, he or she will find it necessary to push the browser "Reload" button to obtain the latest data from the remote database. This requires considerable manual effort and can be fatiguing even when monitoring one online document. The manual effort required for monitoring several online documents simultaneously is so great that it makes such monitoring very difficult, if not impossible to do on a regular basis.

Summary. Online documents generated by online databases provide valuable data that a user may want to monitor. However, this essential information is often accompanied by large quantities of non-essential and even irrelevant information, or information that rarely changes and does not need to be monitored.

Therefore, a method is needed that allows a user to automate monitoring of essential data extracted from online documents while ignoring non-essential or irrelevant data.

In the remainder of this Section we present the state of the art in the technical area of this invention and show how this invention differs from the state of the art.

HTML, browsers, and DOM

HTML, and XML structured online documents are displayed using web browsers such as Navigator by Netscape® Communications and Internet Explorer by Microsoft® corporation.

A web browser is used in the preferred embodiment of the present invention.

However, none of the browsers known to us can display a document fragment in a separate window with no window treatments so that irrelevant information is not seen by the user and this window takes small space on user's screen. Also none of the browsers known to us implement automatic refresh.

The present invention augments the browser behavior and it uses the ability of the more advanced browsers to be controlled by other applications. Also the present invention uses the Document Object Model (DOM) to navigate the content of an online document represented as a tree of nodes.

Web site server-side customizations

Most major websites allow limited server-side customization of their content. Examples are MyYahoo!® on the Yahoo!® website, My Netscape® on the Netscape® website, and the like. These customizations are nothing more than accounts created for users on these web sites. Users see the customized content when they login into their accounts on the web site.

Web site customizations provide a limited choice of what can be customized. For example, the user usually can select a portfolio of stocks to be displayed, but he or she usually cannot select what parameters are presented for a particular stock. Also usually such customizations are limited to very few online data categories. For instance, user can monitor all U.S. stock using such customization, but he or she cannot monitor, say, Brazilian stock even though online stock quotes for Brazilian stock may be available online.

Furthermore, creating user-customized web site content requires complicated and therefore expensive programming from the web site maintainers, so this option is not practical for smaller web sites because of its price and complexity.

Finally, server-customized web pages are still shown in a regular web browser window that has a lot of unnecessary window treatments and user is still required to push the "Reload" button every time he wants to update.

Using the present invention, the user can arbitrarily customize and monitor any web page content and select any presentation format for the customized content, and no programming is required both on web server side and on the user side.

Online data providers

Several online services exist that can push certain online data such as stock quotes to the user's wired or wireless device such as pager or computer.

These services compare to the present invention in the same way as server-side web site customizations, because they have the same problems: limited choice of content that can be monitored, no way to arbitrarily customize presentation of such content and what parameters are included, expensive server-side programming is required.

XML and XSLT

Several techniques exist that transform a higher level abstract document presentation to the lower level document presentation used for rendering the document. Most notable effort in this area is XSLT language that is used to write programs that transform XML documents to HTML documents that are rendered in a web browser. More information about the XSLT language and XML documents can be found on the World Wide Web Consortium (W3C) website.

These techniques do not cover the present invention because they are used to synthesize lower level document presentation from the higher level document presentation but they do not change the content of the document. The present invention is primarily used to change the content of the document without changing the level of abstraction used in the document presentation.

Related Patents

U.S. Pat. No. 5,530,852 to Meske, Jr., teaches how to build web sites that store news articles and serve them to users through the Internet, providing categorization and search services. A typical news article is a structured document that has a title, summary (profile), and body. However, the U.S. Pat. No. 5,530,852 teaches processing news articles in the web server space, and not in the client space. Also the U.S. Pat. No. 5,530,852 teaches programming of reformatting by a highly skilled computer programmer, while the present invention teaches creation of reformatting script by non-programmer user.

U.S. Pat. No. 5,737,592 to Nguyen et al. teaches how to build server-side programs that receive queries from a web browser, automatically convert them to SQL queries, run these queries on a database, convert records returned by the database to HTML and send this HTML back to the requester. The present invention is different from this patent because it applies on the client side and not on the server side and we are not concerned with generation of SQL queries.

U.S. Pat. No. 5,745,754 to Lagarde et al. and U.S. Pat. No. 5,752,246 to Rogers et al. teach how to build server-side programs that use Distributed Integration Solution servers to perform extraction of data requested by a user from databases, and presentation of this data in HTML. These teachings would be of use to a highly-skilled programmer who programs web applications in extracting and reformatting data in a database. But they are different from the present invention, because we teach how non-programmer user can create reformatting scripts on the client side.

U.S. Pat. No. 5,774,123 to Matson teaches how to record a sequence of navigation commands performed by a user on the web browser and how to later replay these commands causing the browser to repeat the navigation session. The record-and-replay feature of this patent does not teach extracting digests of online documents, nor does this patent teach extracting document digests using document trees and displaying the digests in a separate window.

U.S. Pat. No. 5,799,304 to Miller teaches how a user agent can filter, i.e. wholly display or wholly reject, a news article based on criteria provided by the user. That is, it teaches how to make search engines more intelligent by using agent technologies. This patent does not relate to extraction of document digests.

U.S. Pat. No. 5,890,152 to Rapaport teaches how to build a web search engine that takes into account user characteristics such as IQ, etc., all stored in a personal profile database. This patent does not relate to the present invention, because we are not concerned with user characteristics at all.

U.S. Pat. Nos. 5,895,476 and 5,903,902 to Orr et al. are concerned with server side generation of online documents from the specialized higher level representations of documents. This is different from the present invention because the present invention applies on the client side and it does not change the transformed document's level of abstraction.

Accordingly, it is a problem in the art to automatically monitor user-selected fragments of the online documents and to create scripts that perform such monitoring when such scripts are to be created visually by a user without requiring user to write a program of any kind.

SUMMARY OF THE INVENTION

From the foregoing, it is seen that it is a problem in the art to provide a device meeting the above requirements. According to the present invention, a device is provided which meets the aforementioned requirements and needs in the prior art.

Specifically, the device according to the present invention provides a method for extracting digests of structured online documents, and automatic monitoring of the said digests. A digest of an online document is a collection of fragments of this document which are of interest to a user. Creation of the scripts that perform the said digest extraction and monitoring employs visual programming of the online document tree navigation and transformation. The disclosed method can be applied to structured online documents such as HTML, XML, SGML documents, or to any other online document that has internal structure that can be represented by a tree.

More specifically, the system according to the present invention is based on a visual programming whereby a user selects a fragment of an online document shown in the source window and copies this fragment to the target window that contains the reformatted digest. The system according to the present invention generates a sequence of web site navigation commands, online document tree navigation commands, and "Copy Fragment" commands that cause the assembly of the reformatted digest in the target window. The user can later ask the system to replay the sequence of generated commands, thus causing automatic creation of the reformatted digest of the changed version of the online document.

Therefore, according to the present invention, when content of the original document changes and the script that creates the digest is run, the change is automatically propagated to the digest document. This allows implementation of simple automatic monitoring of digests of the online documents which occurs entirely in the user space, that is in the application that controls the user's browser.

The digest document is typically much smaller than the original document, and usually it does not contain computationally intensive and bandwidth intensive multimedia elements such as graphics, sounds, scripts, and controls. This considerably lowers the screen size, bandwidth and processing power requirements for user agents that display document digests. Therefore, documents digests can be displayed by user agents that run on wireless and portable computing devices. Such devices have small screen, and their bandwidth and computational power resources are limited.

The preferred embodiment of the present invention is a computer program that is called WebTransformer™. It runs on Microsoft® Windows® 32-bit operating systems and as of filing date it controls the Microsoft Internet Explorer.

Vocabulary.

Source Document and Source Window. The source window typically contains a regular browser such as Microsoft Internet Explorer. In this window the source online document is shown. Used to navigate to the web page of interest and to select a fragment of this page to be monitored.

Target Document and Target Window. The target window is where the digest of the source document is displayed. The digest of the source document that user monitors is also called the target document. The target window is typically much smaller than the source window and it does not have window treatments such as menu bars and scroll bars, so that it is possible to have many such window on one screen.

Command—Elementary instruction to perform operation on a document tree that can be recorded.

Script—A recorded or otherwise created sequence of commands.

How It Works

The user typically performs the following actions in order to use the present invention.

First, the user browses documents in the source window and when seeing a document of interest selects a fragment of the document that constitutes a digest. Selection is performed by clicking the desired element of the web page. This click is translated by the browser into the address of the node in the document tree that represents the minimal HTML element that covers the clicked area, The user can then use the arrow keys of a computer keyboard to extend, contract, or move sideways the selection. Other selection mouse clicks and keyboard keys may be used depending on the web browser.

When the user finishes selecting the fragment, the user invokes the user interface "Copy" command that copies contents of the selected fragment from the source window to the target window. Please note that target window does not have to be visible when source document fragment is selected. The target window may become visible upon creation of the script. Similarly, source window may be not visible when the script is replayed.

In addition to that, according to the present invention the WebTransformer creates a script that records the source document location, sequence of document tree navigation commands that leads from the tree root to the node that corresponds to the selected fragment, and the "Copy Fragment" command.

The system can record all elements of user navigation including entering User ID and Password or filling out and submitting other online forms that cause the desired navigation.

Finally, according to the present invention the user can ask the WebTransformer to run the script that has been created. The user can request a one-time execution of the script or automatic periodic execution of the script according to a user-specified time table. Script execution results in fresh (not from cache) download of the source document, navigating the source document tree to the selected tree node and copying the selected source document fragment to the target window.

Summary of Benefits

The present invention brings the following benefits to its user:

1. User views and monitors only the fragments of online documents that are of interest to him or her, not the whole documents.
2. User does not have to push the "Reload" button, it is done for him or her automatically by the WebTransformer.
3. Combination of typically small size of target windows and auto-refresh feature allows to monitor many (10–50) online documents simultaneously without applying any manual effort.
4. Since the document digest is small and it typically does not contain large pictures or embedded programs (such as JavaScript, Java, ActiveX programs), the document digests download and execute much faster than the original documents.
5. Since document digests are small in size, and since they require less bandwidth and less computational power to display than the original documents, the document digests can be successfully displayed on small-screen user agents that have bandwidth and computational power limitations, specifically on user agents that run on wireless devices such as cellular phones, pagers, wireless personal digital assistants (PDA), and so on. These devices' primary limitation is screen size, so they would greatly benefit from the present invention.

Other objects and advantages of the present invention will be more readily apparent from the following detailed description when read in conjunction with the accompanying drawings.

DETAILED DESCRIPTION OF THE INVENTION

Windows

In the preferred embodiment a user typically observes two windows per instance of the WebTransformer script:

1. Source Document Window. This window contains the source online document that is displayed using a regular web browser such as Microsoft Internet Explorer. This window is used to navigate to the online document that will be monitored and to select a fragment of the online document to be monitored.
2. Target Document Window. This window is where the digest of the source document appears. This window is usually smaller than the source window and it typically has no window treatments such as menu bars, control box, or scroll bars.

When a WebTransformer script is recorded, source window and maybe target window are displayed. When the recorded script is replayed, user has an option of displaying both source and target window or only the target window. Typically user does not display the source window at the script replay time.

If target document is assembled from several source documents, then several source windows may be displayed. However, each WebTransformer script typically has only one target window associated with it.

The goal of this design is to keep target windows as small as possible so that several such windows monitoring different documents can be placed on the screen without overlapping each other.

Figure 1:
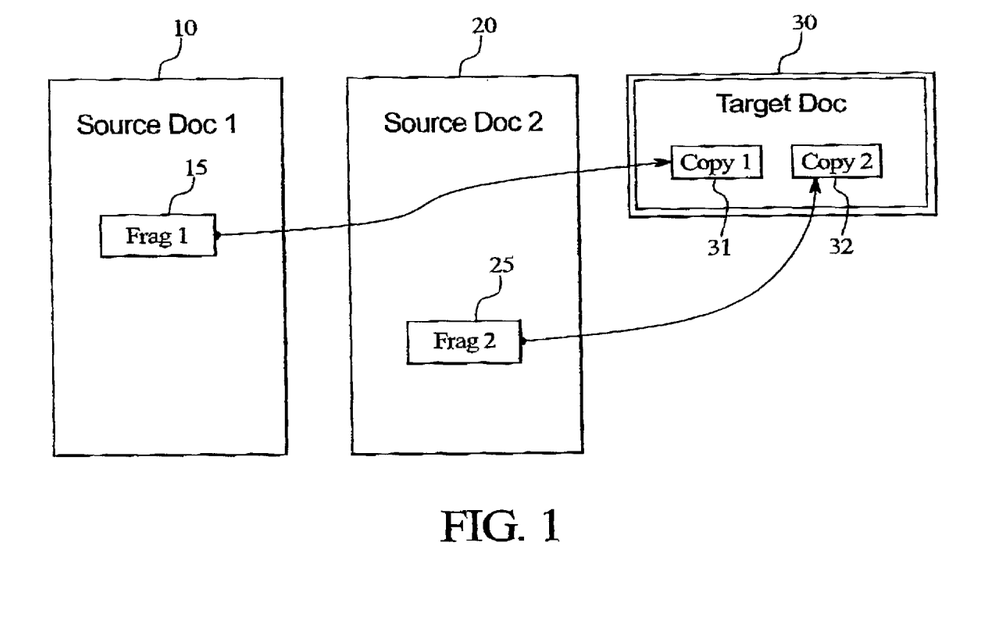
FIG. 1 schematically shows two source documents, each shown in a source window, and a target document shown in a target window.

FIG. 1 schematically shows two source documents in source windows and one target document in the target window. Source document 1 is displayed in the source window 10. Source document 2 is displayed in the source window 20. Target document is displayed in the target window 30.

Figure 2:
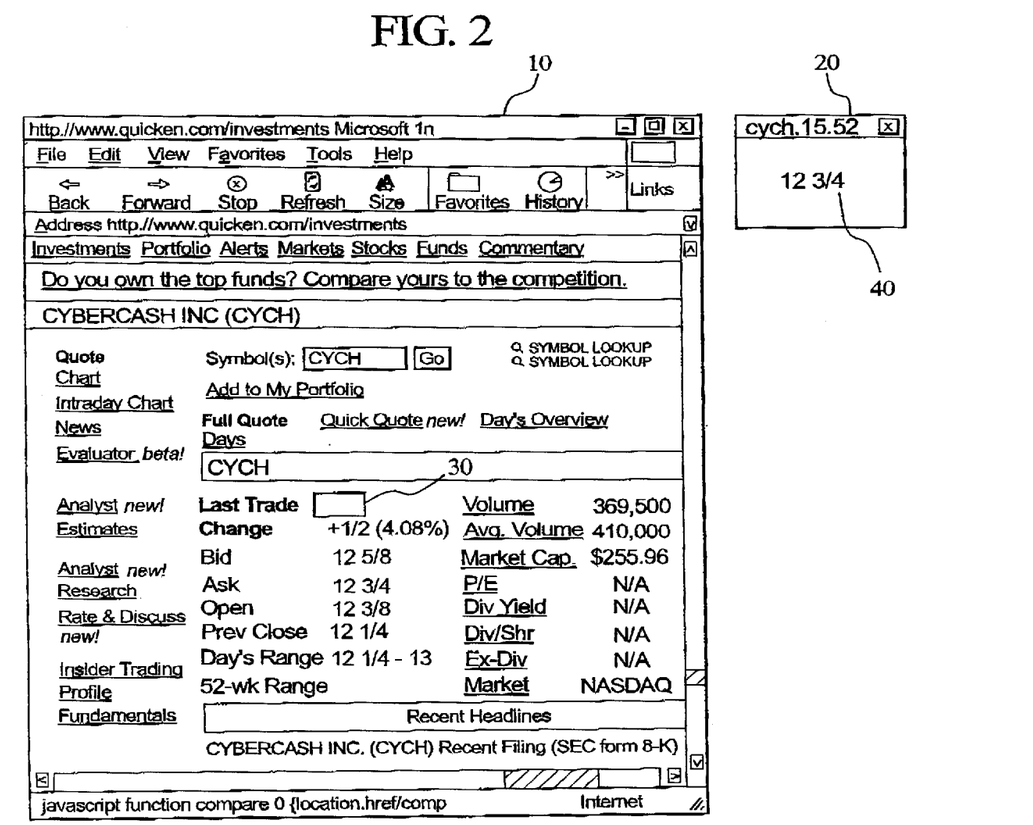
FIG. 2 shows a concrete example of source document from the financial web site contained in source window and the document digest of this document shown in a target window.

FIG. 2 contains the actual screen shot of the working WebTransformer. It shows the source window 10 on the left that contains the source online HTML document from the Quicken® web site that contains a detailed stock quote for CyberCash® Inc. Note that the "Last Trade" digits "12¾" (30) are highlighted to show that these digits constitute the document fragment selected by the user.

The small window 20 on the right is the target window that shows the target online document that contains the same digits "12¾" (40) that constitute the target document fragment that was copied from the source document fragment 30. The target window title contains the name of the WebTransformer script that created the target document and the time when the script was run last time.

Figure 3:
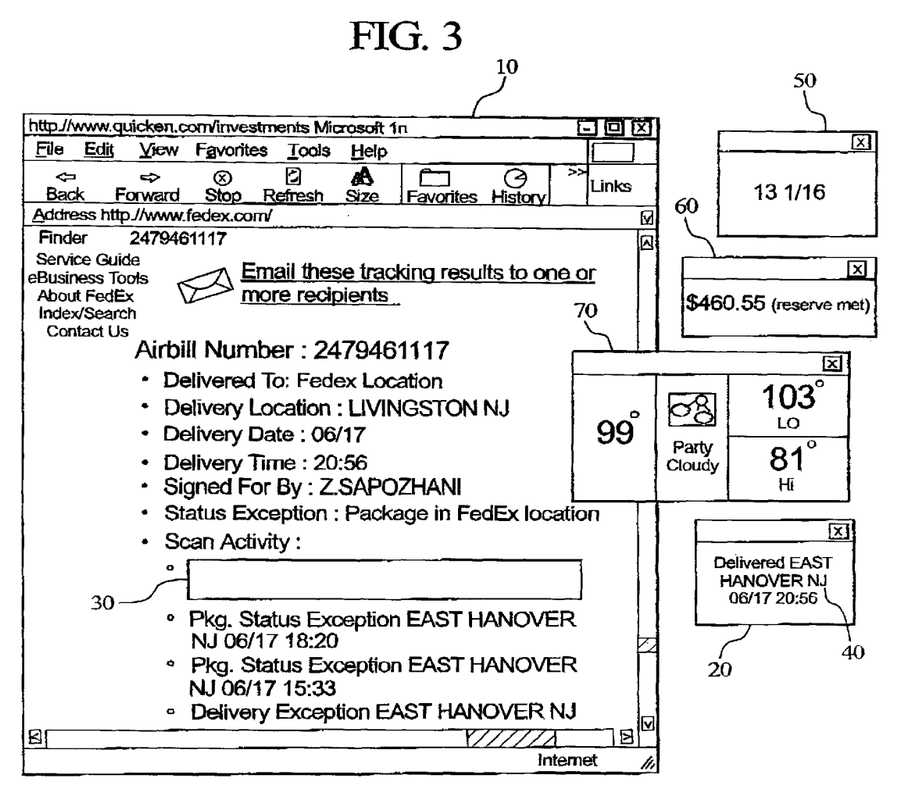
FIG. 3 shows a concrete example of source document obtained from a shipping company and digest of this document monitored in a target window. It also shows several other target windows that monitor other source web pages with their source windows hidden.

FIG. 3 shows the web page (online document) 10, in this case depicting a FedEx® Corp. web page that is used to track air shipments. A user selected web page fragment 30 that contains the latest event that happened to the user's shipment. This fragment is copied to the target window 20 where it is shown as the document fragment 40.

Also shown in FIG. 3 are unrelated WebTransformer target windows 50, 60, and 70 that track other web sites. Specifically, window 50 tracks stock quote taken from a financial services web site, window 60 tracks a particular lot price from the online auction, and window 70 tracks weather in New Jersey from a weather web site. The source windows that correspond to these target windows are hidden on instruction from user.

Source Document Tree and DOM

We use tree representation of the source online document in creating the transformation script according to the present invention. In the document tree each logical unit of the document such as paragraph, table, heading, emphasis is represented by a node. Node A is a child on node B if and only if the document fragment represented by node A is directly embedded into document fragment represented by node B.

The most popular implementation of the online document tree model for HTML and XML online documents is Document Object Model (DOM) (see the World Wide Web Consortium (W3C) website for more details). Document Object Model is implemented in modern browsers such as Microsoft Internet Explorer 5.0, Netscape Navigator 5.0, and the like. The preferred embodiment of this invention uses DOM as a source document tree model. Other embodiments of this invention can use different tree models for representing the source document.

Figure 4:
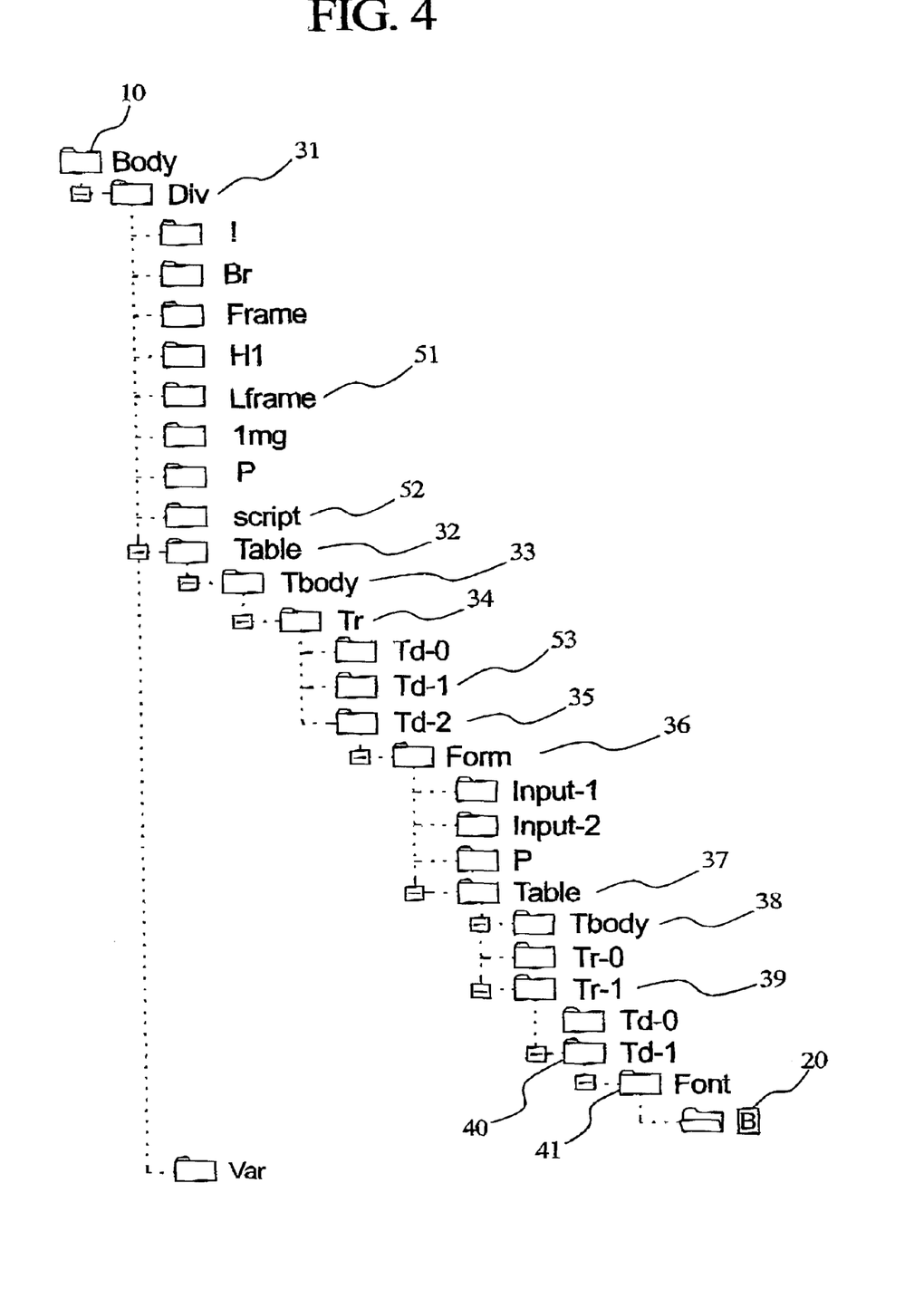
FIG. 4 shows a partial source document tree for the source document shown in FIG. 2.

FIG. 4 shows partial document tree for the source document 10 from FIG. 2 (complete tree is too big to show it on one page). The root of the tree contains BODY element 10 that represents body of the document. The B (for bold) node 20 represents HTML element B that contains the user-selected document fragment 30 on FIG. 2. The path consisting from tree nodes 31, 32, 33, 34, 35, 36, 37, 38, 39, 40, and 41 leads from the root of the tree to the tree node 20.

Creating the Script

A script that performs online document transformation according to this invention (also called WebTransformer Script, or WTS) is created in the following manner.

A source document is displayed in the first window 10 of FIG. 1. The first window 10 is herein referred to as a source window 10. Transformed (target) document is displayed in a second window 30. The second window 30 is herein referred to as a target window 30. Note that target window may be kept invisible until the script is created.

A user can select a source document fragment by clicking the desired fragment using computer pointing device such as a mouse. Selected source document fragment is highlighted. Then, using keys of a computer keyboard, user can expand or contract the selected fragment. In FIG. 1, a fragment 15 is shown as being selected.

Once the fragment 15 is selected, the user can copy the fragment 15 to the target window 30 by selecting "Copy" user interface command from the graphical menu of commands, and a copied fragment then appears in the target window 30 as a target fragment 31. The user can then proceed, for example, to another online document 20, select a fragment 25 therein and copy it to another target location 32 in the target window 30.

The script that downloads the source document and transforms its fragment into the fragment in the target document is created according to the following rules:

1. Add to the script the "Go To URL" command that causes the browser in the source window to navigate to the source document. The location of the source document includes URL address. The location information can also include additional data that needs to be passed to the web server to cause displaying of the page selected by user, such as post data and headers.

Figure 5:
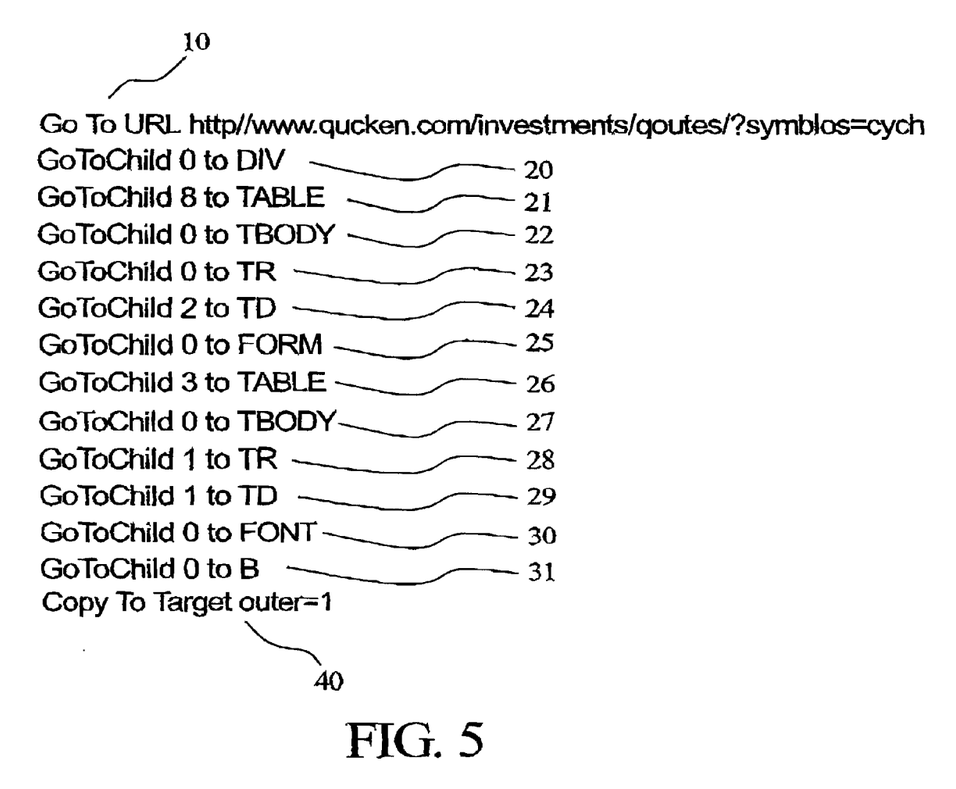
FIG. 5 shows a WebTransformer script that extracts document digest from the source window and shows it in the target window in FIG. 2.

The command 10 from the sample WebTransformer script shown at FIG. 5 causes the browser to navigate to the corresponding address on the Quicken® website. This sample script transforms the source document 10 at FIG. 2 to the target document 40.

2. Add to the script a sequence of "Go To Child" commands that take us from the downloaded document tree root to the document tree node that represents document fragment selected by user for monitoring.

Creation of the command sequence starts with finding a tree node that corresponds to the document fragment selected by the user. WebTransformer asks DOM implementation to compute the minimal HTML element that covers the selection made by the user in document. Single mouse click is treated as a selection of zero width.

Then we use parent links to walk up from the selected node to the root node. While walking, we record the indices of nodes in their parents, so that the recorded path can be walked again from the root, when the document is reloaded.

For instance, the commands 20, 21, 22, 23, . . . , 30, 31 on FIG. 5 walk the tree node path from the root node 10 on FIG. 4 to the user-selected node 20 and on the way they pass tree nodes 31, 32, 33, . . . , 39, 40, and 41.

3. Add to the script the "Copy Fragment" command. Creating the script in the case of multiple source pages requires "Copy Fragment" command to be qualified by the target ID at the target document.

For instance, in FIG. 5 "Copy Fragment" command 40 finishes the script by copying the user-selected source document fragment to the target document.

The formal algorithm for the script creation is as follows:

Input: tree node selected-element that is a part of the source document tree.

Output: the script object that is a list of commands.
  0. Create empty script object.
  1. Add "Copy Fragment" command to the script object.
  2. Set variable e that refers to the current tree node to selected-element.
  3. Do until e is not NULL
     3a. If e. tag is equal to "BODY" or e has no parent then Exit this loop
     3b. Create "Go To Child" command object.
     3c. Node p=e.parent
     3e. Compute integer ix which is equal to index of node e in the node p.
  Index of the first child is 0, index of the second child is 1, and so on.
     3f. Store ix in the command.
     3g. Add command before the first command at the script.
     3x. EndDo
  4. Add "Go To URL" command that navigates browser to the user-selected source page before the first command at the script.

Recorded script can be saved in a computer file and later loaded from that file.

Running the Script

The user can instruct WebTransformer according to the present invention to run the created script or alternatively to run a script loaded from file. The WebTransformer according to the present invention then executes the sequence of commands contained in the script, thus causing the source document(s) to be downloaded from the Internet, and fragment(s) of these documents to be selected and copied to the target window. All this happens automatically according to the recorded script.

The user can either run the script once or instruct the WebTransformer according to the present invention to run the script automatically according to a time table set by the user (for instance, every 5 minutes). The script can be run on the same desktop computer where it was created or the script can be transferred to another computer (for example, by downloading, uploading or e-mailing it) and run on another computer. The other computer may be another computer belonging to the user or can be a server computer which can run this script on a request from a client.

Why the Tree?

Every time we reload the source document, there is no guarantee that it will be the same as the previously loaded document or that it will even be close to the previously loaded document. Many things can change even in the relatively stable documents generated from online databases:

(1) Advertising banners that appear on most web pages change every time the page is loaded, and they may have complicated internal structure that is different for every ad that is displayed;

(2) Certain non-advertising items may substantially change too. For example, on FIG. 2 there is a list of "Recent Headlines". Number of elements in this list and composition of this list may substantially change every few hours as new headlines for the company appear and old headlines are removed. Also the list of available site features ("Chart", "Intraday Chart", "News", "Evaluator" and so on) changes approximately once every month as the site implements new features and removes old features.

So to be able to find the user-selected fragment of the changed source online document we need to rely on a document model such that an algorithm of getting to the user-selected fragment will be the least affected by changes in the other parts of the document. The Document Tree is the document model that was selected for use in the present invention, because it provides good degree of independence of the transformation script from the document changes.

Tree nodes and their children that are not on the path from the root to the user-selected node may change and their change will not affect the path to the user-selected element, so the script that locates this element will still work. For example, on FIG. 4 nodes 51 and 52 are likely to contain the changing content, because they are related to advertising banners that are often put into IFRAME. But these nodes are not on the path from the root node 10 to the user-selected node 20, so even if the entire content of these nodes changes, the transformation script built according to the present invention still will be able to find the user-selected element 20 in the new document tree.

However, if nodes 51 or 52 on FIG. 2 are removed entirely, then the WebTransformer script will not be able to get to the user-selected node 20. Therefore repeated running of these transformation scripts in order to obtain an updated digest of the updated source online document substantially relies on the assumption that the path from the root node to the user-selected fragment node will not change in the new document.

This typically is the case for the frequently updated online documents, because these documents are automatically generated from the same template by a web server program which uses the same template for dynamic online document generation.

Client-Server WebTransformer

In the present invention, as described above, displaying of the document digest occurs in the same process and on the same computer that runs the WebTransformer script and performs the transformation. Under certain circumstances it becomes necessary to separate the document digest displaying function from the document digest creation function, so that these functions may be executed on different computers. Then the program that displays the document digest is called Web rans former client and the program that performs the online document transformation according to the present invention is called WebTransformer server.

Figure 6:
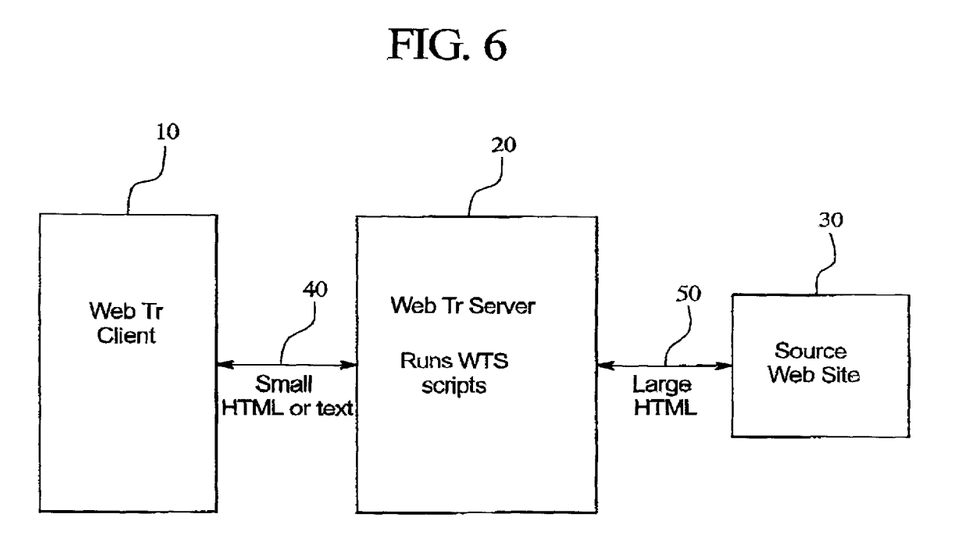
FIG. 6 shows a block diagram for client-server WebTransformer setup.

See FIG. 6 for schematic drawing of the client-server setup. The WebTransformer client 10 sends a request to get the fresh document digest to the WebTransformer server 20, which in turn sends request to download the source online document to the web site 30. When the source online document 50 is returned from the web site 30 to the WebTransformer server 20, the server performs the source document transformation and document digest creation according to the script prepared by the user and uploaded to the server and the resulting document digest 40 is sent back to the requesting client.

The client-server WebTransformer can be used in the following situations:

1. WebTransformer client is located on a small-screen handheld or wireless device. Wireless provider or individuals themselves setup a WebTransformer server and put their WebTransformer script on it. The wireless device client connects to this server to get the document digests. This setup is described in more detail below.
2. A company sets up a firewall that does not give any access to the outside Internet to company employees but uses Internet web sites to feed only the approved information to the employees. The company sets up WebTransformer server 20 and puts on it a number of WebTransformer scripts that extract and reformat the approved data from the Internet. The access to the outside Internet is closed to employees, but they can use their WebTransformer clients 30 to view the approved document digests from the WebTransformer server 20.
3. A company sets up WebTransformer server that monitors a particular web page or assortment of web pages that are of interest to the company. The documents digests extracted by WebTransformer scripts are read by robotic client that converts them to text and stores them into database. This is a good way to arrange important data extraction through the web site.

Handheld and Wireless Devices

The document digest produced by a WebTransformer script is usually smaller than the original document and it usually does not contain computationally intensive and bandwidth intensive multimedia elements such as graphics, sounds, scripts, and applets. This lowers screen size, bandwidth and processing power requirements for user agents that receive and display such document digests.

Since handheld and wireless devices such as screen cell phones, pagers and personal digital assistants (PDAs) all have small screen and most of them also have limitations in available bandwidth and processing power, it is more appropriate to use such devices for online document monitoring using the present invention than to use such devices for web browsing. A complete web browser for such devices, even if developed, is not be very practical, because most web pages are designed for large desktop screens and not for small screens used in handheld and wireless devices. Therefore viewing web page designed for the big screen will not be convenient on the small screen of a handheld device, and developing a small-screen version of every web page out there is impractical.

The present invention provides a way of monitoring small fragments of larger web pages on a handheld or wireless device with a small screen. A preferred scheme of using the present invention to monitor the fragments of the web pages on small-screen device with limitation in available bandwidth and computational power is presented at FIG. 7.

Figure 7:
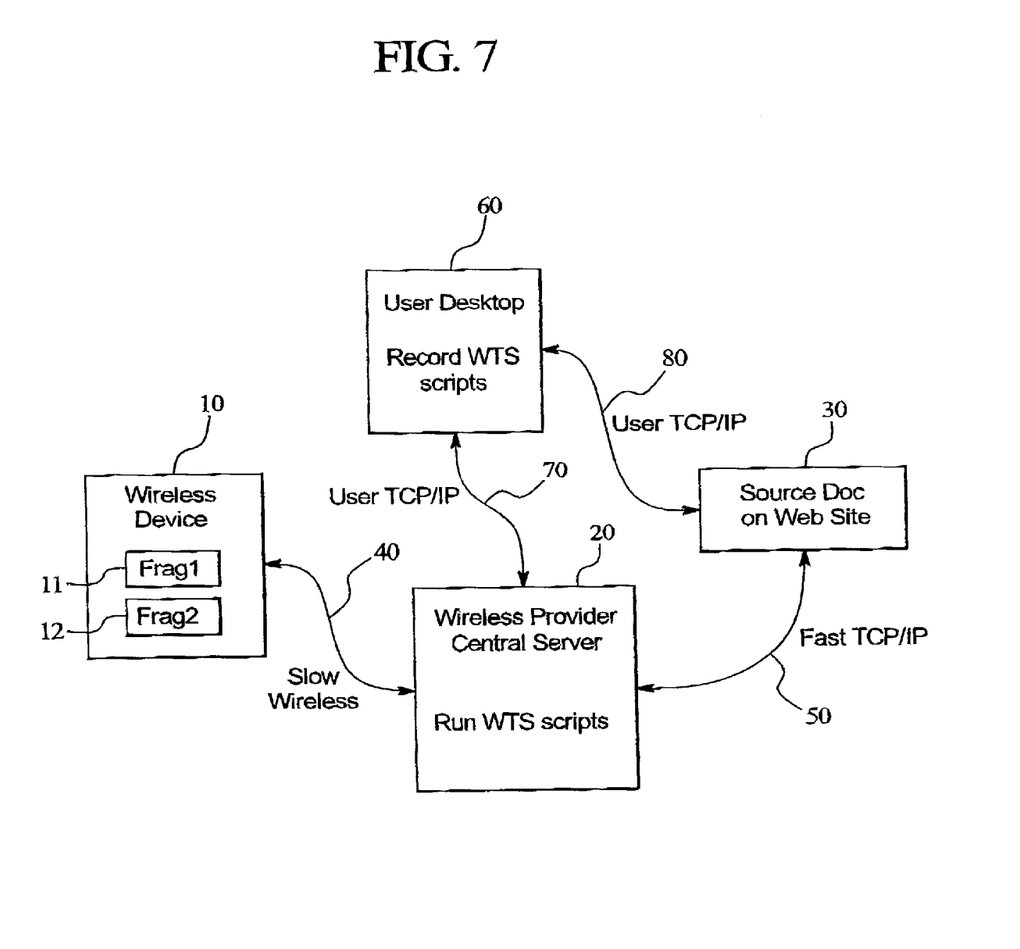
FIG. 7 shows a block diagram of communicating devices for use in a wireless device application according to the present invention.

In this scheme, a user creates scripts according to the present invention on his or her desktop computer 60 on FIG. 7. The created scripts are uploaded to the central server computer 20 of the wireless provider over the user desktop to wireless provider connection 70 which typically is a dialup connection.

The handheld device 10 can communicate with the central wireless computer 20 over a relatively slow wireless or similar link 40. The handheld device can download a list of available WebTransformer scripts that the user uploaded to the central computer. On instruction from the user, the handheld device 10 can ask the central computer 20 to run the transformation script and to send the digest document produced by the script to the handheld device where they are shown as the document digests 11 and 12.

This way communications that require potentially high bandwidth, such as downloading the source online document from the web site 30 to the central computer 20 will occur over the fast communication link 50 that typically exists between server computers, all operations related to the source page downloading and transformation that potentially require higher computing power will occur on the central computer 20, and the handheld device 10 will only need to download a small digest document over the slow link 40 and it will show the smaller digest document 11 or 12 on its small screen.

Also, the user can ask a central server computer 20 to send to the user a target document only when it changes. This way, even less bytes have to be sent between the central computer and the wireless device.

Additional Features

The following features, while not strictly necessary in understanding or applying the ideas of the present invention, are additional aspects of the present invention.

1. Several source online document fragments can be can be used to create one target document. In this case, according to the present invention, the transformation script may contain several sequences of "Go To URL" commands, "Go To Child" commands, and "Copy Fragment" commands that assemble document fragments from several source documents to one target document.

Also in this case target window contains target placeholders that designate the locations to which a particular source documents fragment is copied to. Each target placeholder has a distinctive ID and "Copy Fragment" commands refer to this ID.

2. The target window may contain not only target placeholders but also arbitrary "document frame" content created by the user. Such additional content may be used to mark the target placeholders or the whole target document, or to additionally format the copied source document fragments.

This content is created by the user with help of target document editor. Any HTML editor can be used as a target document editor. For instance, Microsoft FrontPage can be used as a target template editor.

3. A WebTransformer script created according to the present invention can be used as a means of addressing a fragment of online document. WebTransformer script according to the present invention can be displayed on a web site or sent by e-mail. When the user clicks the WebTransformer script displayed on a web site or as an e-mail attachment, the WebTransformer is automatically invoked and it displays the online document fragment designated in the script. Monitoring of the displayed fragment starts automatically after the initial display of the fragment.

4. According to the present invention, a source document fragment to be monitored by user can be addressed not only by a sequence of "Go To Child" commands that follow the path from the source document root to the user-selected tree node, but also by assigning a distinct ID to the node and by using a single "Find by ID" command that finds document tree node uniquely identified by a given ID. This approach requires cooperation from the online document maintainers, because they have to assign distinct IDs to every online document element that is likely to be monitored. They can assign such IDs, for instance by using ID attribute of HTML 4.0.

5. According to the present invention, the WebTransformer can be instructed by the user to automatically compare the current and the previous version of the target online document, so that if they differ, the user is notified by generating alert. Such alert may results in sending e-mail message to the user-specified recipient or in executing a program or script prepared by the user. Also if the target document after being converted to plain text can be interpreted as a number, then one can generate alerts based on whether such number satisfies user-specified alert condition.

The invention being thus described, it will be evident that the same may be varied in many ways. Such variations are not to be regarded as a departure from the spirit and scope of the invention and all such modifications are intended to be included within the scope of the claims.

What is claimed is:

1. A method of extracting a document fragment from a source document having a hierarchical internal structure, and displaying the document fragment in a target window, the method comprising the steps of:

recording a script that finds the source document, navigates the hierarchical internal structure of the source document to find the document fragment, copies the document fragment, and displays the document fragment in the target window;

saving the script on a computer-readable medium; and replaying the script using a computer to automatically redisplay the document fragment in the target window based on a current version of the source document, wherein the script includes navigation commands that lead from a root node of the hierarchical internal structure of the source document to a node of the hierarchical internal structure of the source document that represents the document fragment.

2. A method of extracting a document fragment from a source document as claimed in claim 1, wherein the script further includes a copy fragment command that causes the contents of the selected document fragment to be displayed on the target window.

3. A method of compiling a document digest by extracting at least one document fragment from at least one source document having a hierarchical internal structure, and displaying the document digest in a target window, the method comprising the steps of:

recording at least a script that identifies the at least one document fragment to be copied from the at least one source document to the document digest;

saving the script on a computer-readable medium; and replaying the script using a computer to automatically display the document digest in the target window based on a current version of the at least one source document, wherein the script includes navigation commands that lead from at least one root node of the hierarchical internal structure of the at least one source document to at least one other node of the hierarchical internal structure of the at least one source document that represents the at least one document fragment.

4. A method of compiling a document digest as claimed in claim 3, wherein the script further includes a copy fragment command that causes the contents of the at least one document fragment to be displayed in the document digest.

* * * * *